(12) United States Patent
Boudreaux et al.

(10) Patent No.: US 12,358,820 B2
(45) Date of Patent: *Jul. 15, 2025

(54) SYSTEMS AND METHODS FOR ONLINE CONTROL OF A CHEMICAL TREATMENT SOLUTION USING SCALE SATURATION INDICES

(71) Applicant: CHEMTREAT, INC., Glen Allen, VA (US)

(72) Inventors: Kevin Boudreaux, Sioux Falls, SD (US); Bill Gonzalez, Glenwood, NJ (US); Kerry Killough, Cypress, TX (US); Faycal Finnouche, Algiers (DZ); David Oswald, Hartwell, GA (US)

(73) Assignee: CHEMTREAT, INC., Glen Allen, VA (US)

( * ) Notice: Subject to any disclaimer, the term of this patent is extended or adjusted under 35 U.S.C. 154(b) by 801 days.

This patent is subject to a terminal disclaimer.

(21) Appl. No.: 17/465,180

(22) Filed: Sep. 2, 2021

(65) Prior Publication Data
US 2022/0064038 A1    Mar. 3, 2022

Related U.S. Application Data

(63) Continuation-in-part of application No. 17/001,720, filed on Aug. 25, 2020.

(51) Int. Cl.
*C02F 5/08* (2023.01)
*C02F 1/00* (2023.01)
(Continued)

(52) U.S. Cl.
CPC ............... *C02F 5/08* (2013.01); *C02F 1/008* (2013.01); *C02F 2103/023* (2013.01);
(Continued)

(58) Field of Classification Search
CPC .. C02F 1/008; C02F 1/00; C02F 1/469; C02F 1/46; C02F 5/08; C02F 5/10; C02F 5/12;
(Continued)

(56) References Cited

U.S. PATENT DOCUMENTS

| 3,361,150 A | 1/1968 | Horner |
| 3,718,556 A | 2/1973 | Rohrback |

(Continued)

FOREIGN PATENT DOCUMENTS

EP    2792647 A1    10/2014

OTHER PUBLICATIONS

Apr. 13, 2022 Office Action issued in U.S. Appl. No. 17/001,720.
(Continued)

*Primary Examiner* — Akash K Varma
(74) *Attorney, Agent, or Firm* — Oliff PLC

(57) ABSTRACT

Systems and methods for applying a chemical treatment solution to a process stream in an industrial processing system while the system is online. The method includes measuring a real-time pH of the process stream, determining a dosage of the chemical treatment solution based on a relationship between the dosage and a scale saturation parameter that is calculated based on the real-time pH of the process stream, and controlling application of the chemical treatment solution to the process stream based on the determined dosage.

20 Claims, 9 Drawing Sheets

(51) Int. Cl.
*C02F 103/02* (2006.01)
*C02F 103/10* (2006.01)
*C02F 103/16* (2006.01)

(52) U.S. Cl.
CPC ...... *C02F 2103/10* (2013.01); *C02F 2103/16* (2013.01); *C02F 2209/005* (2013.01); *C02F 2209/02* (2013.01); *C02F 2209/055* (2013.01); *C02F 2209/06* (2013.01); *C02F 2209/07* (2013.01)

(58) Field of Classification Search
CPC ........ C02F 5/14; C02F 5/00; C02F 2001/007; C02F 2103/023; C02F 2103/16; C02F 2103/10; C02F 2209/005; C02F 2209/02; C02F 2209/055; C02F 2209/06; C02F 2209/07; C02F 2209/10; C02F 2209/00; C02F 2209/05; C02F 2209/003; C02F 2201/4612; C02F 2303/22; B01D 61/48; B21B 37/74; B21B 45/02; C22C 33/04; F25D 17/02
USPC ........................................................ 210/696
See application file for complete search history.

(56) References Cited

U.S. PATENT DOCUMENTS

| | | | |
|---|---|---|---|
| 4,464,315 A | 8/1984 | O'Leary | |
| 4,814,406 A * | 3/1989 | Katayama | C02F 5/10 |
| | | | 526/318.4 |
| 6,514,417 B2 | 2/2003 | Purta et al. | |
| 8,524,088 B2 | 9/2013 | Arbogast et al. | |
| 9,586,842 B2 | 3/2017 | Gifford et al. | |
| 2003/0052303 A1 | 3/2003 | Buentello et al. | |
| 2003/0127391 A1 | 7/2003 | Craft et al. | |
| 2010/0051559 A1* | 3/2010 | Musale | C02F 5/12 |
| | | | 210/701 |
| 2012/0091069 A1 | 4/2012 | Fischmann | |
| 2012/0297928 A1 | 11/2012 | Lang et al. | |
| 2013/0026105 A1* | 1/2013 | Duarte | F28F 25/00 |
| | | | 210/696 |
| 2013/0256135 A1 | 10/2013 | Jha et al. | |
| 2014/0197102 A1 | 7/2014 | Van Der Wal et al. | |
| 2016/0115046 A1 | 4/2016 | Gifford et al. | |
| 2016/0229726 A1 | 8/2016 | Felipe et al. | |
| 2018/0186656 A1 | 7/2018 | Drewniak et al. | |
| 2020/0239344 A1 | 7/2020 | Rodrigues | |
| 2021/0331942 A1 | 10/2021 | Boudreaux et al. | |

OTHER PUBLICATIONS

Nov. 18, 2020 International Search Report issued in International Application No. PCT/US2020/047877.
Nov. 18, 2020 Written Opinion of the International Searching Authority issued in International Application No. PCT/US2020/047877.
U.S. Appl. No. 17/001,720, filed Aug. 25, 2020 in the name of Finnouche et al.
Dec. 15, 2021 International Search Report issued in International Application No. PCT/US21/48843.
Dec. 15, 2021 Written Opinion of the International Searching Authority issued in International Application No. PCT/US21/48843.
Oct. 26, 2022 Office Action issued in U.S. Appl. No. 17/001,720.
Sep. 26, 2023 Office Action issued in U.S. Appl. No. 17/001,720.
Apr. 10, 2024 Office Action Issued in U.S. Appl. No. 17/001,720.
Mar. 15, 2024 Extended European Search Report issued in Application No. 20951772.1.

* cited by examiner

SYSTEMS AND METHODS FOR ONLINE CONTROL OF A CHEMICAL TREATMENT SOLUTION USING SCALE SATURATION INDICES

This application is a Continuation-in-Part of application Ser. No. 17/001,720, filed Aug. 25, 2020. The entire contents of the prior application are hereby incorporated by reference herein in their entirety.

TECHNICAL FIELD

This application relates to systems and methods for automated online control of chemical solutions using scale saturation indices in industrial water systems.

BACKGROUND

Mineral scaling is perhaps one of the most common and detrimental problems throughout all water treatment applications, from reverse osmosis processes, to boiler applications, to once-through cooling. Scaling occurs when the saturation index for a compound (e.g., calcium, silica, magnesium) is exceeded. A scale saturation index (SSI) represents the degree of saturation of water with respect to a specific compound. SSI calculations were developed to predict whether or not a water stream has a scaling or a corrosion tendency. Whether a water solution exceeds the SSI for a given compound, is affected by factors such as an increase or decrease in temperature, pH, and/or ionic concentrations.

In primary metal manufacturing (e.g., manufacturing products from metal ore and/or scrap metal), proper cooling water management proper cooling water management is essential for preventing corrosion and minimizing scale in process cooling water (PCW) control systems in these applications. While the presence of scale will prevent corrosion, too much scale will impair the operation of the PCW system. Accurate measurement of the parameters that indicate cooling water scaling potential is necessary for attaining a proper balance between corroding and scaling environments.

Langelier Saturation Index (LSI) and Ryznar Stability Index (RSI) are types of SSIs. LSI/RSI chemical equilibrium models derived from the theoretical concept of saturation and provide indicators of the degree of saturation of water with respect to calcium carbonate. LSI was formulated in the 1930's, and RSI was formulated in the 1940's as a more refined indication of scaling and corrosion potential in a water system. Both indices are recognized and used metrics in the industry of process water control and treatment.

Determination of LSI and RSI is generally carried out in the laboratory using water samples that have been secured from a process stream. The formulation for these indices requires that the following variables are measured, concurrently and accurately:

(1) pH;
(2) Total Dissolved Solids (TDS), defined as 0.7*Conductance in $\mu S/cm$;
(3) Temperature;
(4) Calcium Hardness as $Ca^{+2}$; and
(5) Alkalinity.

Over the years, development of on-line equipment for the determination of items (2)-(5) above has occurred, but online pH determination has not been successful in dirty process water systems in primary metal manufacturing processes, e.g., iron, steel, and aluminum manufacturing, because the contaminates have fouled existing pH monitors. Due to this limitation, real-time LSI/RSI determinations in the following systems have not been possible:

(1) Direct Reduced Iron (DRI) PCW systems;
(2) Blast Furnace Process Water Systems;
(3) Basic Oxygen Furnace (BOF)/Quick Basic Oxygen Process (QBOP)/Basic Oxygen Steelmaking (BOS) Processes; and
(4) Mining systems such as, e.g., gold mining systems.

Further, temperature, process loading, and pH changes, are drivers of seasonal variation in the water systems. Conventional processes usually adjust anti-sealant feed no sooner than on a weekly basis, and without regard to the seasonal variation. As a result, operators have no choice but to feed anti-sealant according to a worst-case scenario, i.e., overfeeding to ensure that enough anti-sealant is applied at all times regardless of variation in seasonal load impact. This results in an overall increase in inefficiency and expense. As a result, there is a substantial need for better methods for assessing anti-sealant demand and automating anti-sealant feed patterns based on the demand.

SUMMARY

The inventors conducted work at a DRI plant and demonstrated that an online pH sensor used in a PCW clarifier may provide a "trouble-free" sensor capable of providing the "missing" variable to accurately calculate in real time LSI and RSI for process water.

Thus, in some aspects, the disclosed embodiments provide for a pH sensor that eliminates the need for continuous cleaning and re-standardization, providing comprehensive equipment, a programmable logic controller (PLC), and an algorithm package that enables continuous, reliable, and accurate LSI/RSI monitoring for PCW systems in DRI, Blast Furnace, other primary metal making processes, and mining processes.

In one embodiment, there is provided a method for applying a chemical treatment solution to a process stream in an industrial processing system. The method comprises, while the system is online, measuring a pH of the process stream, determining in real time a dosage of the chemical treatment solution based on a relationship between the dosage and a scale saturation parameter that is calculated based on the pH of the process stream, and controlling application of the chemical treatment solution to the process stream based on the determined dosage.

In another embodiment, there is provided a non-transitory computer readable storage medium storing a program for causing a computer to execute the above method.

In another embodiment, there is provided a system for applying a chemical treatment solution to a process stream in an industrial processing system. The system comprises a pH sensor configured to measure a pH of the process stream while the system is online, and a controller configured to execute the steps of determining in real time a dosage of the chemical treatment solution based on a relationship between the dosage and a scale saturation parameter that is calculated based on the real-time pH of the process stream, and controlling application of the chemical treatment solution to the process stream based on the determined dosage.

BRIEF DESCRIPTION OF THE DRAWINGS

Disclosed embodiments are illustrated and described herein with reference to the various drawings, in which like reference numbers are used to denote like system components/method steps, as follows.

DETAILED DESCRIPTION

Figure 1:
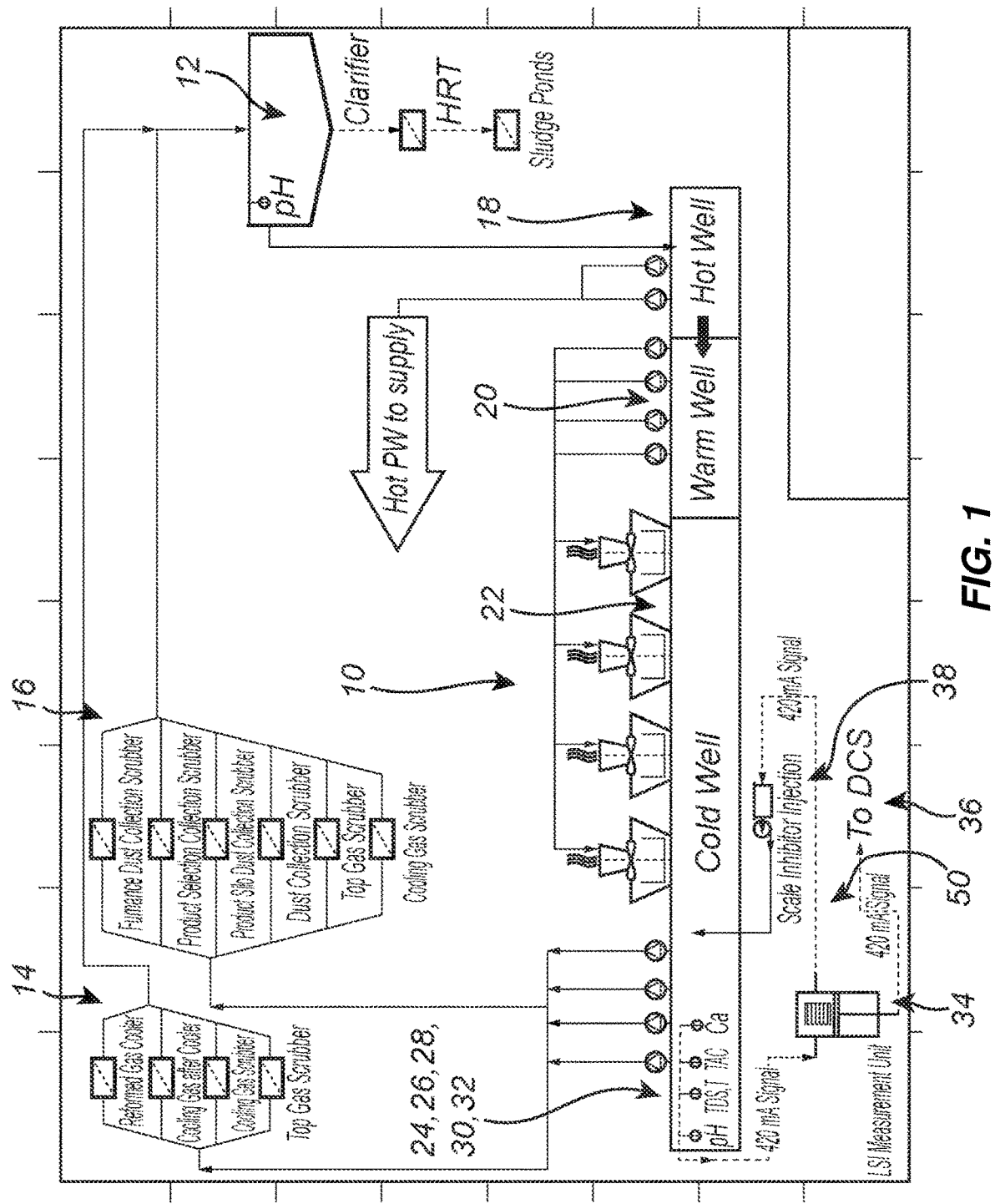
FIG. 1 is a schematic diagram of a PCW system according to embodiments.

Disclosed systems and methods employ an online pH probe along with conventional online hardness and alkalinity, specific conductivity, and temperature probes to allow for novel online measurement and recordation of SSI parameters. The SSI calculation is determined based on the measured and recorded SSI parameters. According to disclosed methods, online automated control of the chemical (e.g., anti-sealant) feed operation is effected based on the SSI calculation.

As used herein, the term "online" refers to a measurement being taken and recorded while the water system is operational and water is processed through equipment, such as a heat-exchanger, as opposed to being "offline" when operation ceases.

In embodiments, there is provided a PCW system for primary metal applications (e.g., iron, aluminum, and steelmaking), the PCW system may include a plurality of sensors operable for sampling a plurality of characteristics of PCW, a LSI/RSI measurement unit coupled to the plurality of sensors and operable for calculating one or more of LSI and RSI based on the plurality of characteristics, and an anti-sealant injection system operable for injecting one or more anti-sealant chemicals into the PCW responsive to the calculated one or more of the LSI and the RSI to thereby control scale formation in the PCW. The plurality of sensors may include one or more of a pH sensor operable for measuring a pH characteristic of the PCW, a total dissolved solids (TDS) sensor operable for measuring a TDS characteristic of the PCW, a temperature sensor operable for measuring a temperature characteristic of the PCW, a calcium hardness sensor operable for measuring a calcium hardness characteristic of the PCW, and an alkalinity (TAC) sensor operable for measuring an alkalinity characteristic of the PCW. The anti-sealant injection system may include a distributed control system (DCS) in communication with the LSI/RSI measurement unit and an anti-sealant chemical dosing pump. Optionally, the plurality of sensors are disposed within a clarifier of the PCW system. Optionally, the plurality of sensors are disposed within a cold well of the clarifier of the PCW system. Alternatively, the plurality of sensors are in-line downstream of a heat exchanger of the PCW system. Optionally, the anti-sealant injection system is fluidly coupled to a cold well of a clarifier of the PCW system.

In other embodiments, there is provided a PCW method for primary metal applications (e.g., iron, aluminum, and steelmaking), the PCW method may include sampling a plurality of characteristics of PCW using a plurality of sensors, calculating one or more of LSI/RSI based on the plurality of characteristics using a LSI/RSI measurement unit coupled to the plurality of sensors, and injecting one or more anti-sealant chemicals into the PCW responsive to the calculated one or more of the LSI and the RSI using an anti-sealant injection system to thereby control scale formation in the PCW. The plurality of sensors include one or more of a pH sensor operable for measuring a pH characteristic of the PCW, a total dissolved solids (TDS) sensor operable for measuring a TDS characteristic of the PCW, a temperature sensor operable for measuring a temperature characteristic of the PCW, a calcium hardness sensor operable for measuring a calcium hardness characteristic of the PCW, and an alkalinity (TAC) sensor operable for measuring an alkalinity characteristic of the PCW. The anti-sealant injection system includes a distributed control system (DCS) in communication with the LSI/RSI measurement unit and an anti-sealant chemical dosing pump. Optionally, the plurality of sensors are disposed within a clarifier of the PCW system. Optionally, the plurality of sensors are disposed within a cold well of the clarifier of the PCW system. Alternatively, the plurality of sensors are in-line downstream of a heat exchanger of the PCW system. Optionally, the anti-sealant injection system is fluidly coupled to a cold well of a clarifier of the PCW system.

In other embodiments, there is provided a non-transitory computer-readable medium stored in a memory and executed by a processor to execute PCW method steps for primary metal, iron, and steelmaking applications. The steps may include sampling a plurality of characteristics of PCW using a plurality of sensors, calculating one or more of LSI/RSI based on the plurality of characteristics using a LSI/RSI measurement unit coupled to the plurality of sensors, and injecting one or more anti-sealant chemicals into the PCW responsive to the calculated one or more of the LSI and the RSI using an anti-sealant injection system to thereby control scale formation in the PCW.

The Water System

The disclosed online SSI calculation and chemical feed embodiments can be used in conjunction any suitable water system including, but not limited to, natural water, drinking water, industrial water, urban effluent, industrial effluent, sludge systems, primary metal process water systems, iron and steelmaking process water systems, once-through water systems, recirculating water systems, and mining systems.

In the primary metal industry (e.g., iron, aluminum, and steelmaking), process water systems are used to cool process gas and equipment so that the manufacturing process is enhanced, and critical components are cooled effectively. Due to the heat and contaminates in the water, water treatment chemicals are used to ensure that scaling and corrosion are minimized throughout the process. Historically, the LSI and RSI have been used to determine the conditions of the water and determine the appropriate dosing of chemicals based upon the indices. However, infrequent testing, and lack of dosing adjustment based upon re-tests (if they occur), result in inaccurate anti-sealant chemical feed rates when a process changes. As a result, water treatment feeding is either overdosed (at extra expense) or underdosed (causing increased scaling and process problems).

FIG. 1 is a schematic diagram of an embodiment of the disclosed PCW system. As seen in FIG. 1, the PCW system 10 is coupled to a clarifier 12 that receives process water from a reformed gas cooler, a cooling gas after-cooler, a cooling gas scrubber, and top gas scrubber, and/or the like 14, as well as a furnace dust collection scrubber, a product selection dust collection scrubber, a product silo dust collection scrubber, a dust collection scrubber, a top gas scrubber, a cooling gas scrubber, and/or the like 16, and delivers the process water to one or more of a hot well 18, a warm well, and a cold well 22 of the clarifier 12 of the PCW system 10. Additional components might be included in some plants or in future plants, but the general idea is that process water from a primary metal manufacturing plant with saturation index levels»1 due to calcium scaling can be effectively controlled.

Specifically, in a DRI process, PCW is circulated to the following systems:
(1) Top Gas Scrubber;
(2) Cooling Gas Scrubber;
(3) Cooling Gas After Cooler;
(4) Reforming Gas Cooler; and
(5) Dust Collection Scrubber System.

These water lines have varying degrees of contaminates in the water, but the primary contaminates are iron (from the process) and calcium (from the iron ore coating and make-up water chemistry). The calcium contamination generally causes the biggest problems in the process because calcium ions ($Ca^{+2}$) combine with bicarbonate alkalinity ($HCO_3^-$) forming calcium carbonate ($CaCO_3$). The scaling potential varies based on the saturation index of calcium carbonate, and this scaling potential can be approximated by the LSI and RSI. In Blast Furnace ironmaking and BOF steelmaking, similar problems occur due to the same water chemical reactions.

In order to overcome the scaling potential of all these water systems, the industry has used these indices to approximate the scaling potential, and then utilized various anti-sealant chemistries in the water to sequester the formation of scale.

For example, chemical feed for scale control has been based on experience and/or economic conditions. However, excessive feeding can increase operating costs and too little feeding can cause scaling and production problems. Dosing is controlled by a dosing pump and pump timer, but lagging indicators, scale coupons and lab testing, are used, resulting in inconsistent performance and requiring production shutdowns to remediate scaling that occurs. When lab data is used to establish LSI/RSI rates, correct anti-sealant feed rates are generally based upon one or a limited number of data points, resulting in inconsistent chemical effectiveness because dosages are not based upon real-time data. Again, dosing is controlled by a dosing pump and pump timer, but lagging indicators, scale coupons and lab testing, are used, resulting in a lack of real-time decision making and suboptimal operating processes.

Scale formation can thus result in the following problems:
(1) Reduced production (tpy, tph);
(2) Excessive repair or pipework replacement due to scale formation;
(3) Additional annual cleaning costs to hydro jet buildup out of the pipework;
(4) Extra energy consumption to pump water through decreased diameter pipework; and
(5) Decreased product quality.

The above issues can result in millions of $USD annually in production, maintenance, and operational expense loses.

Disclosed embodiments provide systems and methods that use LSI and RSI calculations to determine the scaling potential in the PCW and provide real-time adjustments in chemical dosing to the PCW circuit. This determination greatly reduces the scaling potential in a more comprehensive and economical manner from existing technologies. The solution incorporates reliable monitoring of the salient parameters, which are used to calculate the LSI/RSI in real time via a PLC, and utilizes a feed-forward loop through the DCS to adjust chemical dosing based upon the data obtained. The ability to calculate the scaling potential greatly improves the process performance and can extend the "run time" for the plant, which typically must shut down for water related scaling and fouling issues. Embodiments include "building out" the needed instrumentation to measure pH, TDS, Temperature, Hardness, and Alkalinity (to calculate the LSI and RSI). This data is then integrated into a PLC algorithm that is fed into the DCS to compare current data versus setpoint LSI/RSI data. Deviations (+ or −) from the setpoint system data enable the anti-sealant pump to receive a 4/20 ma signal to adjust the feed rate for the current situation.

The advantages of this system include, but are not limited to:
(1) Chemical feed is based upon system data metrics—LSI and RSI measurements;
(2) Chemical feed is optimized, and is not necessarily consistent hour to hour, but is optimized by the LSI and RSI metrics;
(3) Chemical feed is decreased when needed or increased, thereby annual chemical spending is optimized for the process;
(4) Alarms are established and triggered if the scaling index increases greatly, which potentially can point to a problem with the lime coating on the ore, for example;
(5) Alarms also trigger system blow down when water contamination increases above established set points; and
(6) Pipework throughout the process has greatly reduced build-up of scale—
   a. Improving energy usage,
   b. Extending component life,
   c. Reducing CapEx costs (i.e., replacement), and
   d. Extending year-to-year run cycle for the plant.

Real-time results enable greater system chemical treatment response and control, thereby enhancing process performance and extending the operational months for a given plant as water related fouling and scaling are greatly diminished.

The PCW circuit is the largest water system in a DRI process, for example, and is central to performance of the plant. Each of the below systems are cooled by this water system and productivity, quality, and energy optimization are impacted by this water system:
(1) Top Gas Scrubber;
(2) Cooling Gas Scrubber;
(3) Cooling Gas After Cooler;
(4) Reforming Gas Cooler; and
(5) Dust Collection Scrubber System.

The PCW may cool and protect each of these systems and in order to optimize effectiveness, and heat transfer may be optimized.

Online SSI Measurement and Recordation

Efficient heat transfer is necessary for the proper function of a cooling tower or heat exchangers. Heat transfer is significantly hindered by even very thin deposits of scale. Beyond inefficiency, extreme scaling can lead to flow obstruction and eventually equipment failure. Consequently, it is critical to monitor scale forming potential in cooling water.

Scale is the generic term for the deposits that form on the interior surfaces of piping and other equipment that contacts cooling water. Settled solids and precipitated salts can both contribute to scale. The most common scales are salts of alkali earth metals, and the most common of these are calcium salts, such as calcium carbonate, $CaCO_3$. Because calcium carbonate is one of the least soluble salts, its saturation point is a useful indicator of the overall scale forming potential of the cooling water.

Precipitation is governed by several water quality parameters: pH, hardness, alkalinity, temperature, and TDS. Precipitation will not occur under conditions that favor solubility, where salt concentration is lower than the saturation point. But environments that favor precipitation are common in cooling water circuits. In addition, as cooling water is lost to evaporation and drift, the components of scale are concentrated. This concentration, known as cycling, increases the scaling potential.

Generally, the PCW system is treated with anti-sealants to minimize scale formation, but even with treatment, most plants have some scale formation. The origin of the scale is predominately from the calcium used for the iron ore coating with additional calcium coming from the level in the make-up water.

The reaction which occurs is as follows:

$$CaO+H_2O \rightarrow Ca(OH)_2$$

$$Ca(OH)_2+CO_2 \rightarrow CaCO_3\downarrow+H_2O$$

Precipitation occurs when the mineral saturation index of $CaCO_3$ is greater than one (1). (Saturation Index>1 is defined when the mineral salt concentration in the water phase can no longer remain dissolved in water).

For calcium carbonate, solubility in water is inversely related to temperature, which exacerbates the scaling tendency in the PCW. This phenomenon led the water treatment industry to develop mathematical models which would aid in the determination of the scaling potential in given aqueous environments. Two of the most widely used models are the LSI and RSI.

LSI addresses the concept of mineral saturation using pH as a main variable. LSI can be interpreted as the pH change required to bring water to equilibrium. Water with a LSI of 1.0 is one pH unit above saturation. Reducing the pH by 1 unit will bring the water into equilibrium. This occurs because the portion of total alkalinity present as $CO_3^{-2}$ decreases as the pH decreases, according to the equilibria describing the dissociation of carbonic acid:

$$H_2CO_3 \leftrightarrows HCO_3^- \rightarrow H^+$$

$$HCO_3^- \leftrightarrows CO_3^{-2} \rightarrow H^+$$

The formula for LSI is given by:

$$LSI=pH-pH_s$$

where
pH is the measured water pH; and
$pH_s$ is the pH at saturation in calcite or calcium carbonate and is defined as:

$$pH_s=(9.3+A+B)-(C+D)$$

where
$A=(Log_{10}[TDS]-1)/10$
$B=-13.12 \times Log_{10}(° C.+273)+34.55;$
$C=Log_{10}[Ca^{2+}$ as $CaCO_3]-0.4;$ and
$D=Log_{10}[$alkalinity as $CaCO_3]$.

The solubility of calcium carbonate decreases as pH increases. When the actual pH is greater than the pH at which calcium carbonate is saturated, precipitation and scaling will be favored. This is indicated by a positive LSI (>0), or an RSI<6. When the actual pH is less than the pH at which calcium carbonate is saturated, solubility, and corrosion, will be favored. This is indicated by a negative LSI, or an RSI>6. An LSI of 0, or RSI of 6, indicates equilibrium. Neither index quantifies the amount of scale present. They only serve as indicators of the potential for scale or corrosion:

If LSI is negative: No potential to scale, the water will dissolve $CaCO_3$;
If LSI is positive: Scale can form and $CaCO_3$ precipitation may occur; and
If LSI is close to zero: Borderline scale potential, water quality or changes in temperature, or evaporation, could change the index.

RSI attempts to correlate scale thickness observed to the water chemistry. Like the LSI, the RSI has its basis in the concept of saturation level. RSI is given by:

$$RSI=2(pH_s)-pH$$

where:
pH is the measured water pH; and
$pH_s$ is the pH at saturation in calcite or calcium carbonate.
The correlation of RSI can be summarized as follows:
RSI<<6, the scale tendency increases as the index decreases;
RSI>>7, the calcium carbonate formation probably does not lead to a protective corrosion inhibitor film; and
RSI>>8, mild steel corrosion becomes an increasing problem.

These indices are very important models used for the process water systems of a DRI-PCW system, as well as Blast Furnace and Steelmaking water systems, because they all have a general tendency to become scale forming under the operating conditions.

Using the LSI and RSI calculations above and typical water chemistry parameters for a PCW system (below) the water can be shown to be mildly scale forming:
pH=8.3;
Ca Hardness=300;
Alkalinity=200;
Temperature=36;
TDS=1400;
LSI=1.5; and
RSI=5.3.

The LSI and RSI models are used extensively, as mentioned, throughout the industry, but scale control technology within the DRI, Iron, and Steelmaking industries have only indirectly used these models to aid in scale control of the process. There is no real-time monitoring or controlling of these water systems to add the required level of treatment. The best technology available can only run off-line laboratory LSI/RSI tests, but rarely are adjustments made even if the tests are run.

Conventional methods have typically been limited to laboratory testing and oftentimes identified laboratory scale potential increases do not result in increased anti-sealant feed rates at the plant. Conversely, if scaling potential decreases, chemical feed rates are not reduced. The disclosed systems and methods utilize improved instrumentation design to build out equipment that provides the needed measurements to make necessary calculations to establish pump feed rates based on scaling potential, as discussed further below.

The systems and methods of the disclosed embodiments incorporate existing technologies, in a novel control scheme that has never been successfully deployed in the past—because, the reliability of components has not existed until very recently. Functionally, this idea is novel, because control of anti-sealant feed has never been automated based upon real-time LSI/RSI measurements in primary metal industry (e.g., iron, aluminum, and steelmaking) process water systems. Combining all the needed components into a deployed process control scheme enables the PCW process to be protected from scaling and operational limitations.

Figure 2:
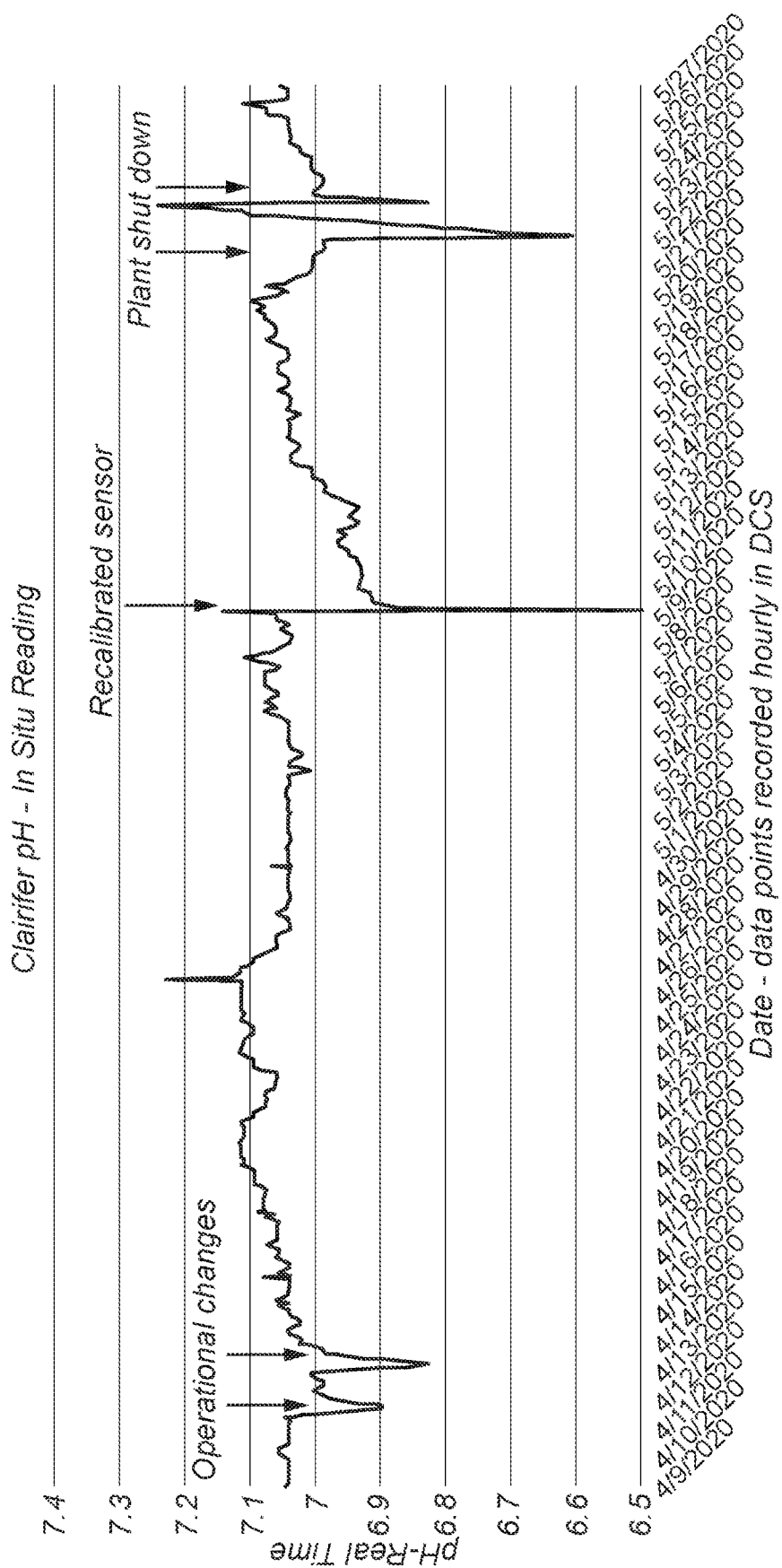
FIG. 2 is a plot illustrating an example of in situ clarifier pH readings over time and under different operational conditions.

The inventors conducted work at a DRI plant and demonstrated that an online pH sensor used in a PCW clarifier is capable of providing the pH measurement needed to accurately calculate in real time LSI and RSI for process water. The results of the test are illustrated in FIG. 2. FIG. 2 illustrates real time pH observed over time using the pH sensor according to embodiments.

Figure 3:
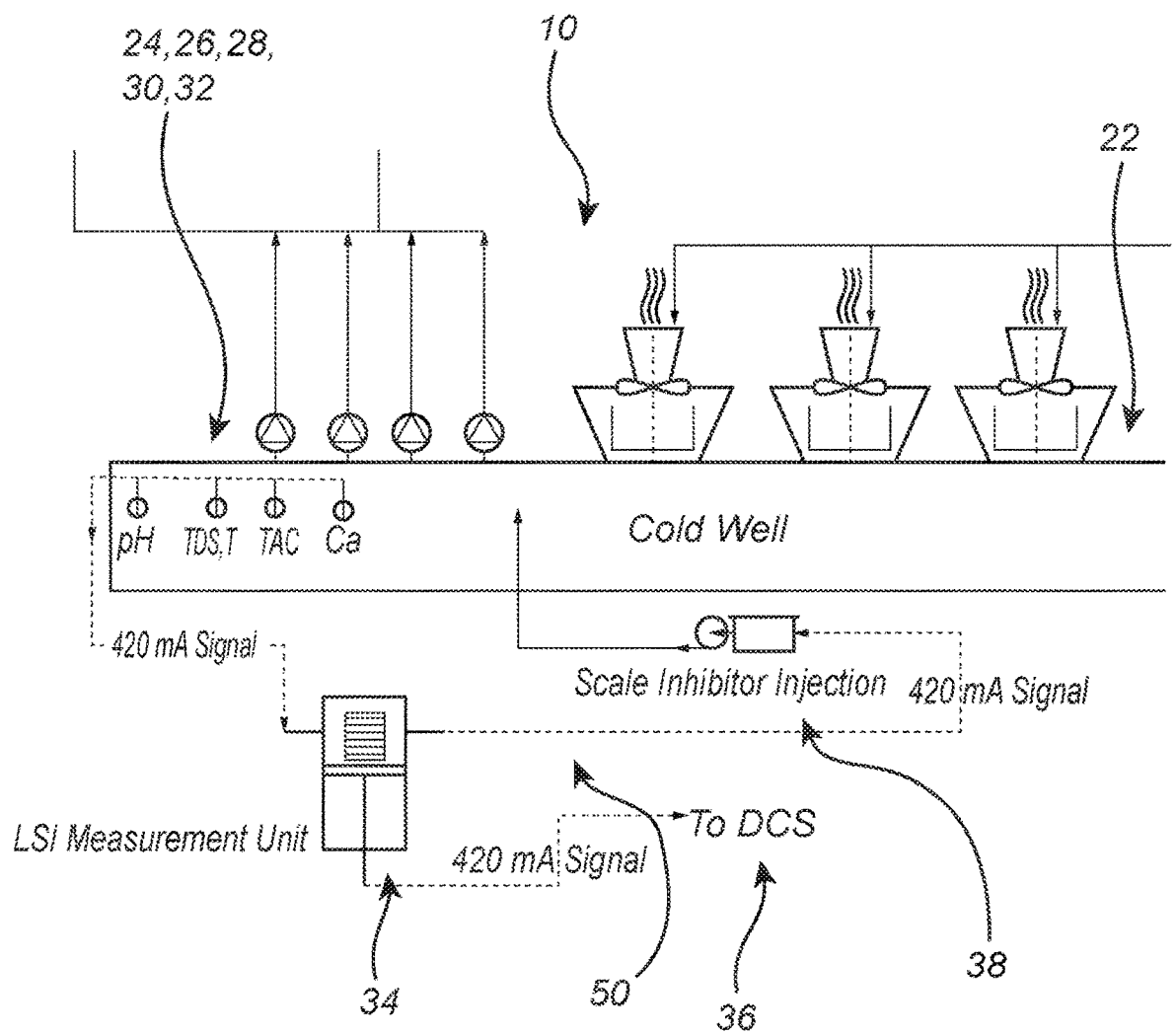
FIG. 3 is a schematic diagram of one exemplary embodiment of the LSI/RSI-based anti-sealant dosing feedback control loop of the PCW system according to an embodiment.

FIG. 3 is a schematic diagram of one embodiment of the LSI/RSI-based anti-sealant dosing feedback control loop of the disclosed PCW system.

As seen in FIG. 3, a pH sensor 24, a TDS sensor 26, a temperature sensor 28, a calcium hardness sensor 30, and a total alkalinity titer (TAC) sensor 32 are in communication with the cold well 22 of the PCW system 10. The pH sensor 24 includes a solid state analyzer for monitoring the pH of the industrial water. The TDS sensor 26 indirectly monitors by conductance, utilizing conductivity probes with 2 or 4 electrodes that enable the building of a conductivity analyzer loop providing easy measurement and signal relay to the PLC. The factor for TDS is 0.7*Conductance in μS/cm. The temperature sensor 28 in includes a thermometer. The calcium hardness sensor 30 and the TAC sensor 32 use titration as the detection method and are capable of operation in a wide range of water qualities—analog and digital output options are available so that readings may be integrated into the LSI/RSI calculation(s). While some of these devices are known in the art, they have not been applied in disclosed context of the disclosed applications.

The various sensors are all coupled to a LSI/RSI measurement unit 34 and/or the DCS 36 of the PCW system 10, the latter of which controls all higher functions of the PCW system 10. The LSI/RSI measurement unit 34 calculates the LSI/RSI using the sensor data. This provides an LSI/RSI feedback loop 50 for anti-sealant injection.

Chemical Feed Automation and Control

Using the online SSI calculations from above, anti-sealant treatment solutions are able to be controlled, i.e., adjusted and optimized, while the system is online, thereby increasing overall efficiency and reducing costs. The chemical treatment solution may include any suitable system treatment chemical such as, for example, anti-sealants or corrosion inhibitors. In embodiments, the chemical treatment solution includes an anti-sealant. Any suitable scaling inhibitors may be used in the chemical treatment solution including, but not limited to, hydroxyethylidene diphosphonic acid (HEDP), phosphonobutane tricarboxylate (PBTC), polyamino polyether methylenephosphonate (PAPEMP), amino-tris-methylene phosphonate (AMP), diethylenetriaminepenta(methylene-phosphonate) (DETPMPA), polymaleic anhydride (PMA), acrylic acid/acrylamido methyl prone-sulfonate (AA/AMPS), phosphino-carboxylic acid polymer (PCA), polyacrylic acid (PAA), and mixtures thereof. It will be understood that the precise make-up of the anti-sealant(s) in the chemical treatment solution will be dependent upon the requisite scale control plan and system operating conditions.

Similarly, the dosage control plan for the application of the treatment solutions will be dependent upon the specific contents of the anti-sealant treatment solution, the control plan and system operating conditions. According to the online methods, the dosage amount and rate curves can be developed for each treatment solution applied, to thereby allow for the change in dosage amounts and rates based on the calculated SSIs. These curves plot SSI to ppm/ppb dose rate. SSI curves are developed by determining the concentration of a specific scale inhibitor necessary to inhibit scale formation at various saturation index values along a spectrum.

Figure 4:
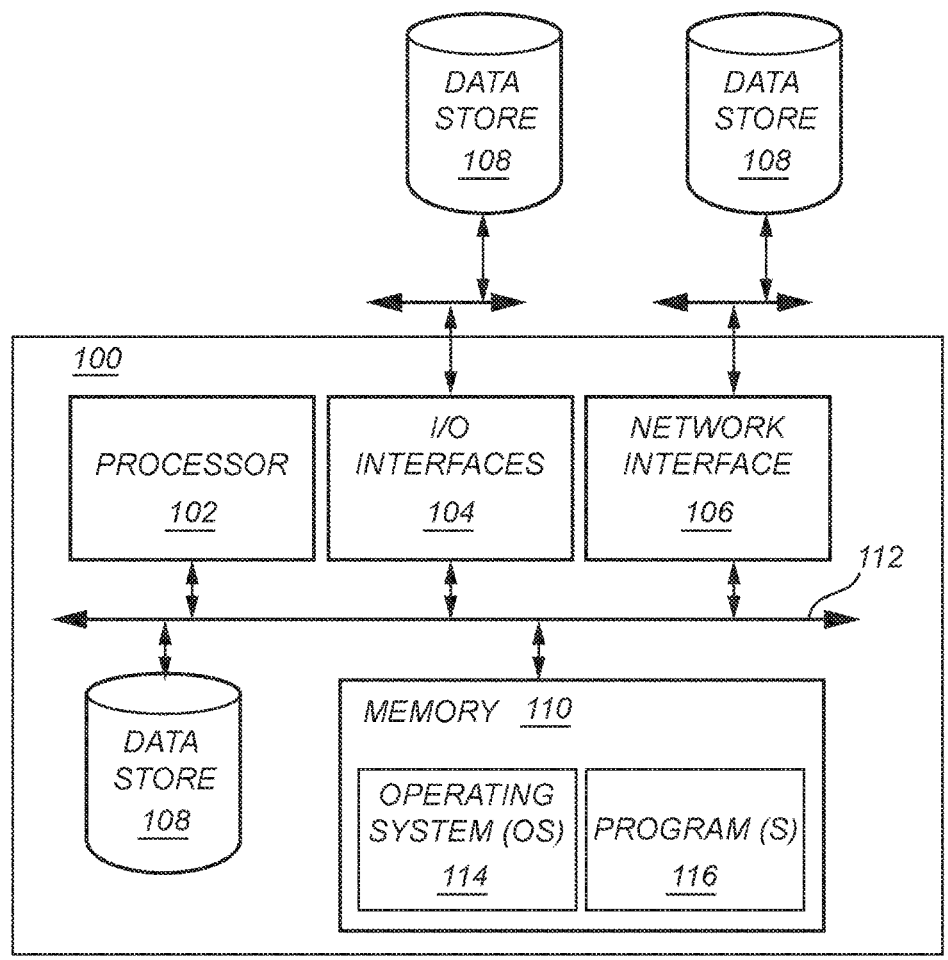
FIG. 4 is a block diagram of a computer server which may be used in the PCW system according to embodiments.

Referring now specifically to FIG. 4, the LSI/RSI measurement unit 34 (as shown in FIGS. 1 and 3) and/or the DCS 36 (as shown in FIGS. 1 and 3) consist of one or more computers or servers 100, which may be used stand-alone or in a networked or cloud-based system. In terms of hardware architecture, the computer or server 100 generally includes a processor 102, input/output (I/O) interfaces 104, a network interface 106, a data store 108, and memory 110 storing a non-transitory computer-readable medium including executable instructions. It should be appreciated by those of ordinary skill in the art that FIG. 4 depicts the computer/server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but is not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the computer/server 100, a semiconductor-based microprocessor (in the form of a microchip or chipset), or generally any device for executing software instructions. When the computer/server 100 is in operation, the processor 102 is configured to execute software stored within the memory 110, to communicate data to and from the memory 110, and to generally control operations of the computer/server 100 pursuant to the software instructions. The I/O interfaces 104 may be used to receive user input from and/or for providing system output to one or more devices or components.

The network interface 106 may be used to enable the computer/server 100 to communicate on a network, such as the Internet. The network interface 106 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the computer/server 100, such as, for example, an internal hard drive connected to the local interface 112 in the computer/server 100. Additionally, in another embodiment, the data store 108 may be located external to the computer/server 100, such as, for example, an external hard drive connected to the I/O interfaces 104 (e.g., a SCSI or USB connection). In a further embodiment, the data store 108 may be connected to the computer/server 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

It will be appreciated that some embodiments illustrated herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain nonprocessor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various illustrative embodiments.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Referring again specifically to FIGS. 1 and 3, the DCS 38 directs the injection of anti-sealant into the cold well 22 of the PCW system 10 (or otherwise) based on the LSI/RSI calculation. Thus, the scale inhibitor injection system 38 includes an appropriate dosing pump and conduit, as is well known to those of ordinary skill in the art. Scale inhibitors are specialty chemicals that are added to water to delay, reduce and/or prevent scale deposition. Compounds based on acrylic acid polymers, maleic acid polymers and phosphonates have been used extensively for scale treatment in water systems due to their excellent solubility, thermal stability and dosage efficiency. In the water treatment industry, the major classes of scale inhibitors are inorganic phosphate, organo phosphorous, and organic polymer backbones. The below lists many candidates that may be used per the disclosed embodiments:

PBTC (phosphonobutane-1,2,4-tricarboxylic acid),
ATMP (amino-trimethylene phosphonic acid),
HEDP (1-hydroxyethylidene-1,1-diphosphonic acid),
PAA (polyacrylic acid),
PAAS (polyacrylic acid sodium salt),
HPMA (Hydrolyzed Polymaleic Anhydride),
AA AMPS Copolymer (copolymer of acrylic acid and 2-acrylamide-2-methyl propane sulfonic acid),
AA/HPA (Acrylic Acid-hydroxypropyl Acrylate Copolymer-Acrylic Acid/Acrylate/Sulfosalt Terpolymer),
PCA (Phosphino carboxylic acid),
PPCA (phosphinopolyacrylates),
PMA (polymaleic acids),
MAT (maleic acid terpolymers),
SPOCA (sulfonic acid copolymers—sulfonated phosphonocarboxylic acid, and polyvinyl sulfonates),
DTPMP (Diethylenetriamine-penta (methylene phosphonic acid)),
MA-AA (acrylic acid maleic acid copolymer), PSO (phosphor succinic oligomer),
PAPEMP (Polyamino Polyether Methylene Phosphonate),
HPAA (2-Hydroxy Phosphonoacetic Acid),
HDTMP (Hexamethylenediamine Tetra-methylene Phosphonic Acid), and/or
BHMTPMPA (Bis(hexamethylene) Triamine Penta(methylene-phosphonic Acid)).

Figure 5:
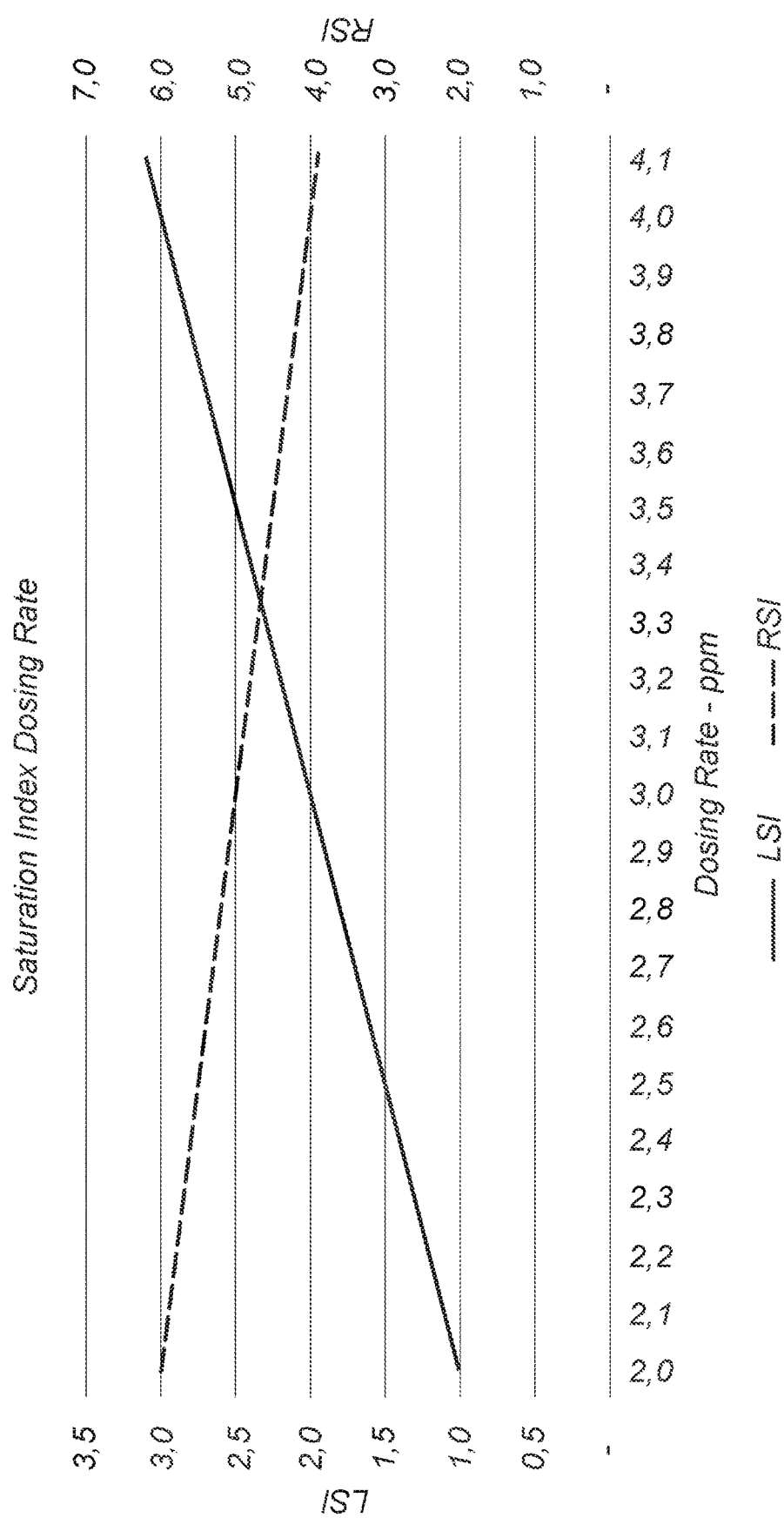
FIG. 5 is a plot illustrating an example anti-sealant dosing scheme for various LSI/RSI calculations using the PCW system according to embodiments.

Thus, the PCW system 10 includes a pH sensor which has demonstrated reliable readings in the environment of the present application, conductivity instrumentation which determines the TDS in the system, a temperature sensor, a calcium analyzer, an alkalinity analyzer, an LSI/RSI PLC controller to calculate LSI/RSI and 4/20 mA signal outputs to the DCS, dosing pump equipment with 4/20 mA signal inputs to adjust feed based upon the DCS signal, and chemical selection based upon baseline water analysis to ensure that scale formation is effectively sequestered. Each of the sensors is deployed in the cold well of the clarifier (or in-line after a heat exchanger) and sends its signals to the PLC controller to calculate the LSI/RSI and determine the proper chemical dose using a site-specific algorithm. The dosing algorithm is established at each site because of make-up water chemistry variation and anti-sealant product selection, but, essentially, the algorithm can use a model similar to the graph of FIG. 5. Anti-sealant selection chemistry is varied and has degrees of effectiveness in any given water system. Therefore, once the water is analyzed and anti-sealant selection is determined, the graph can be modified slightly and incorporated into the local algorithm. Based on the local model and the resultant calculation, the PLC will send the dosing algorithm to the DCS from which the DCS can make needed adjustments to the chemical feed pump. The dosing need of anti-sealant can be automatically adjusted from a setpoint level (up or down) with a signal from the DCS to the chemical feed pump.

The online pH sensor may have a measurement capability at real-time, i.e., continuously, or at near real-time, or intervals with a testing frequency being within predetermined intervals. In various embodiments, the intervals may be less than 5 minutes, less than 10 minutes, less than 15 minutes, less than 20 minutes, less than 30 minutes, less than 1 hour, less than 2 hours, less than 6 hours, or less than 12 hours. The intervals may be in the range of 1 minute to 24 hours, 1 minute to 12 hours, 5 minutes to 12 hours, 10 minutes to 6 hours, 15 minutes to 2 hours, 20 minutes to an hour, or 30 minutes to an hour. The frequency employed in measurements taken in the disclosed embodiments may depend on the particular system. For example, it will be understood that the scale inhibition dynamics of the specific system.

Preferably, the pH sensor of the disclosed embodiments is made of materials that are customized to the environment that they are to be used in, and are designed to chemically withstand the environment and exhibit wear resistance caused by aggressive gasses and abrasion from high-velocity solids. The electronic transmission function uses latest technology. Solid state construction can be completely sealed and customized to the environment. Internal O-rings can be omitted as these degrade and are prone to failure. Gels and electrolytes are preferably not used as these can easily contaminate and increase maintenance. A large surface area is used that reduces fouling and improves reliability. Glass characteristics result in very low drift and reliable readings over prolonged periods—2-4 weeks. Glass construction cam be highly durable, and double and triple-junction construction provides long life.

The disclosed embodiments are unique in several ways. The SSI calculations are predictors of the potential for scale formation. Consequently, the value of SSI-to-anti-sealant dosage can be set to prevent scale from forming. It is therefore a proactive online key performance indicator rather than reactive like the conventional performance monitors (e.g., the retractable scale coupons or manual monitors). The advantages of the disclosed systems and methods include, but are not limited to:

(1) Chemical feed IS based upon system data metrics—LSI and RSI measurements;
(2) Chemical feed is optimized, and is not necessarily consistent hour to hour, but is optimized by the LSI and RSI metrics;
(3) Chemical feed is decreased when needed or increased, thereby annual chemical spending is optimized for the process;
(4) Alarms are established and triggered if the scaling index increases greatly, which potentially can point to a problem with the lime coating on the ore, for example;
(5) Alarms also trigger system blow down when water contamination increases above established set points; and
(6) Pipework throughout the process has greatly reduced build-up of scale—
   a. Improving energy usage,
   b. Extending component life,
   c. Reducing CapEx costs (i.e., replacement), and
   d. Extending year-to-year run cycle for the plant.

Real-time results enable greater system chemical treatment response and control, thereby enhancing process performance and extending the operational months for a given plant as water related fouling and scaling are greatly diminished.

Additionally, the programmable logic behind the SSI-to-anti-sealant dosage can be refined in the field in response to real-time real-world conditions and performance at the site. And adjustments to anti-sealant dosages based on SSI and/or calcium balance can be made virtually instantaneously, as opposed to a periodic review of a coupon, or a reading from a deposit monitor, and the subsequent follow-up manual adjustment of the anti-sealant feed pump. As a result, the disclosed embodiments will provide real-time and more effective scale control management compared to conventional processes by improving the overall reliability, efficiency, and economic productivity of the mine and its mineral recovery.

Embodiments may further include machine learning algorithms implemented on the disclosed controllers for executing the disclosed functions in a predictive manner. For example, the machine learning algorithms may be used to establish historical patterns to predict future feed needs based on any one or more parameters that may include, but are not limited to, time of day, time of year, current weather, rainfall, and other process inputs. Outputs of the predictive logic controllers may be connected to, for example, a weather station to provide ambient weather data or other external reporting and analysis site such as inventory control device.

The programmatic tools used in developing the disclosed machine learning algorithms are not particularly limited and may include, but are not limited to, open source tools, rule engines such as Hadoop®, programming languages including SAS®, SQL, R and Python and various relational database architectures.

Each of the disclosed controllers may be a specialized computer(s) or processing system(s) that may implement machine learning algorithms according to disclosed embodiments. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the disclosed embodiments may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

Additional Process Systems

The disclosed online SSI calculation and chemical feed embodiments can be used in conjunction with various types of process systems including, but not limited to, once-through systems, recirculating systems, and systems that are unique to mineral processing.

Figure 6:
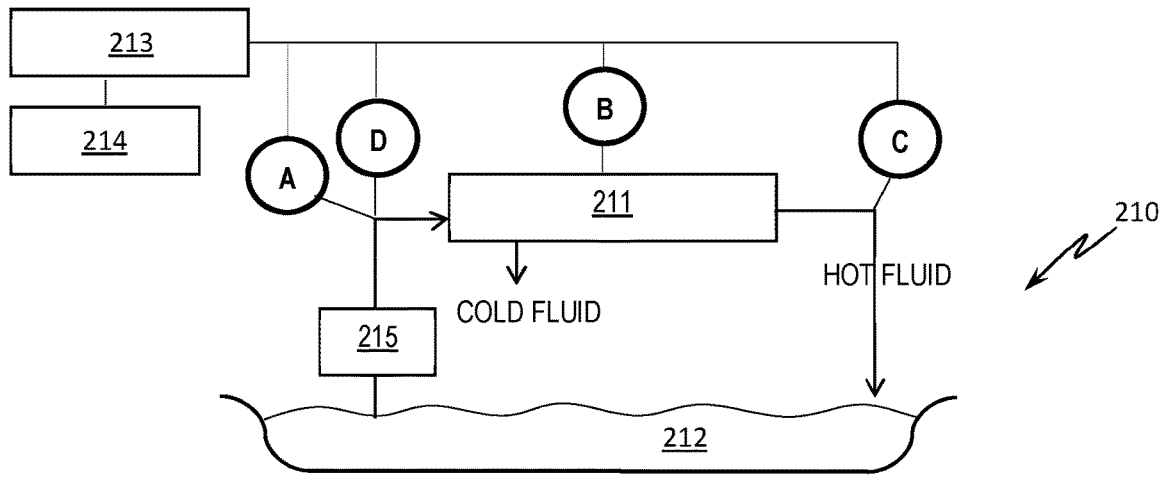
FIG. 6 is a schematic diagram of a once-through system according to an embodiment.
Figure 7:
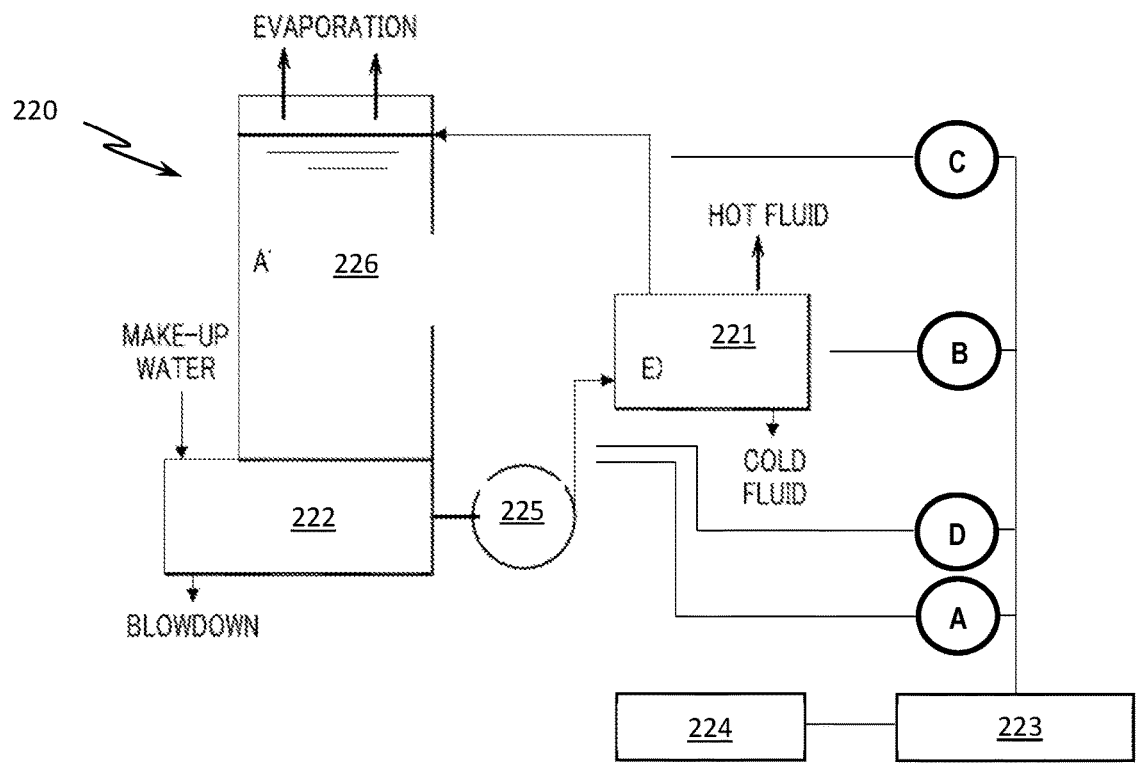
FIG. 7 is a schematic diagram of a recirculating system according to an embodiment.

The water system may be, for example, a once-through system 210, as illustrated in FIG. 6, or a recirculating system 220, as illustrated in FIG. 7. These systems including cooling components, such as heat exchangers, for cooling water flow streaming through the systems.

As seen in FIG. 6, the once-through system 210 includes a flow path defined by water sourced from a natural water source that is pumped through a heat exchanger 211 via pump 215 and returned to the same or different water source 212. As seen in FIG. 7, the recirculating system 220 includes a flow path defined by water sourced from a natural water source 222 that is pumped through a heat exchanger 221 via pump 225 and then enters the atmospheric cooling tower 226 after leaving the heat exchanger 221 to be cooled by the cooling tower then recirculated through the system.

As seen in FIGS. 6 and 7, the systems 210 and 220 include probes A, which include a pH probe, an online hardness and alkalinity analyzer, and a conductivity probe, that is disposed upstream of the heat exchanger 211,221. Systems 210 and 220 also include process temperature probes B and C (e.g., inlet water temperature, outlet water temperature, and process side temperature), as shown in FIGS. 6 and 7.

Feed system D is disposed upstream of the heat exchanger 211,221 and is configured to feed a specified chemical treatment solution into the water stream before it enters the heat exchanger 211,221. By bringing the inputs collected from probes A, B, and C back to a controller 213,223 (e.g., a programmable logic controller, or PLC), feed system D is controlled based on the results computed by the PLC, as shown in FIGS. 6 and 7. The systems 210 and 220 may also include a data storage 214,224 for storing various dosage and amount schemes implemented by the controller 213, 223, as seen in FIGS. 6 and 7.

The disclosed online SSI calculation and chemical feed embodiments can be used in conjunction with mineral process systems. These systems typically involve treating a heap of crushed and agglomerated ore with an appropriate lixiviant (e.g., a diluted alkaline cyanide solution) to dissolve the metals (leachate), collecting the leachate in a pond or tank (pregnant or value bearing solution), processing the pregnant solution to recover the metals, and recycling the barren solution (with additional lixiviant) back to the heap.

Figure 8:
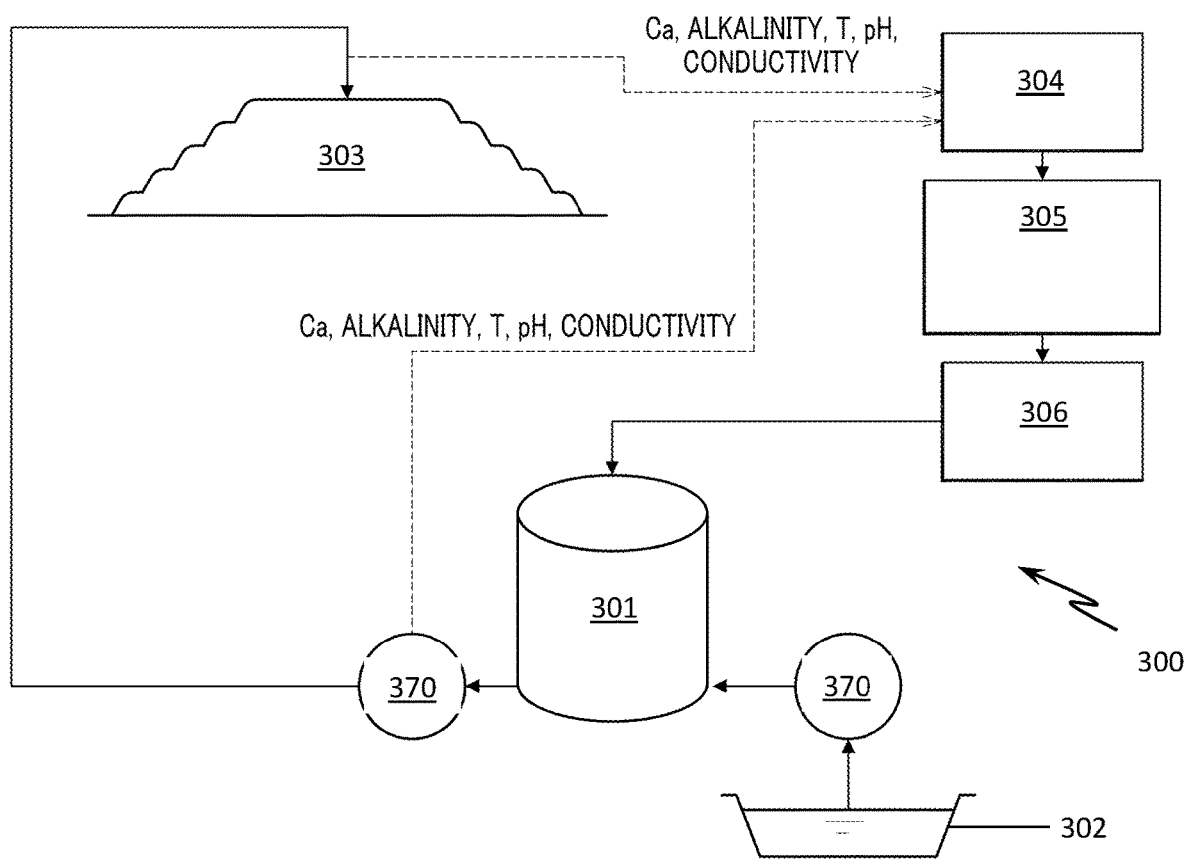
FIG. 8 is a schematic diagram of a mineral process system including an automated chemical feed control system according to an embodiment.
Figure 9:
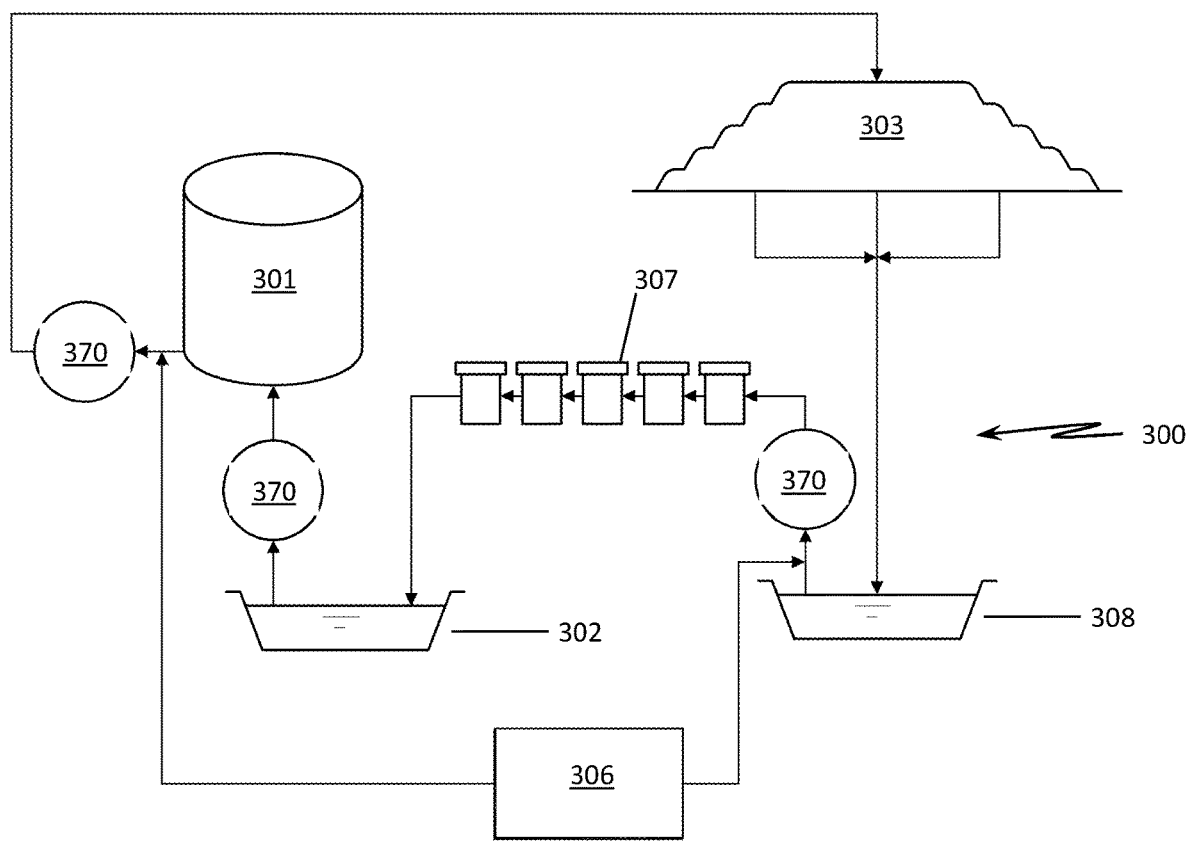
FIG. 9 is a schematic diagram of a mineral process system including an automated chemical feed control system according to an embodiment.
Figure 10:
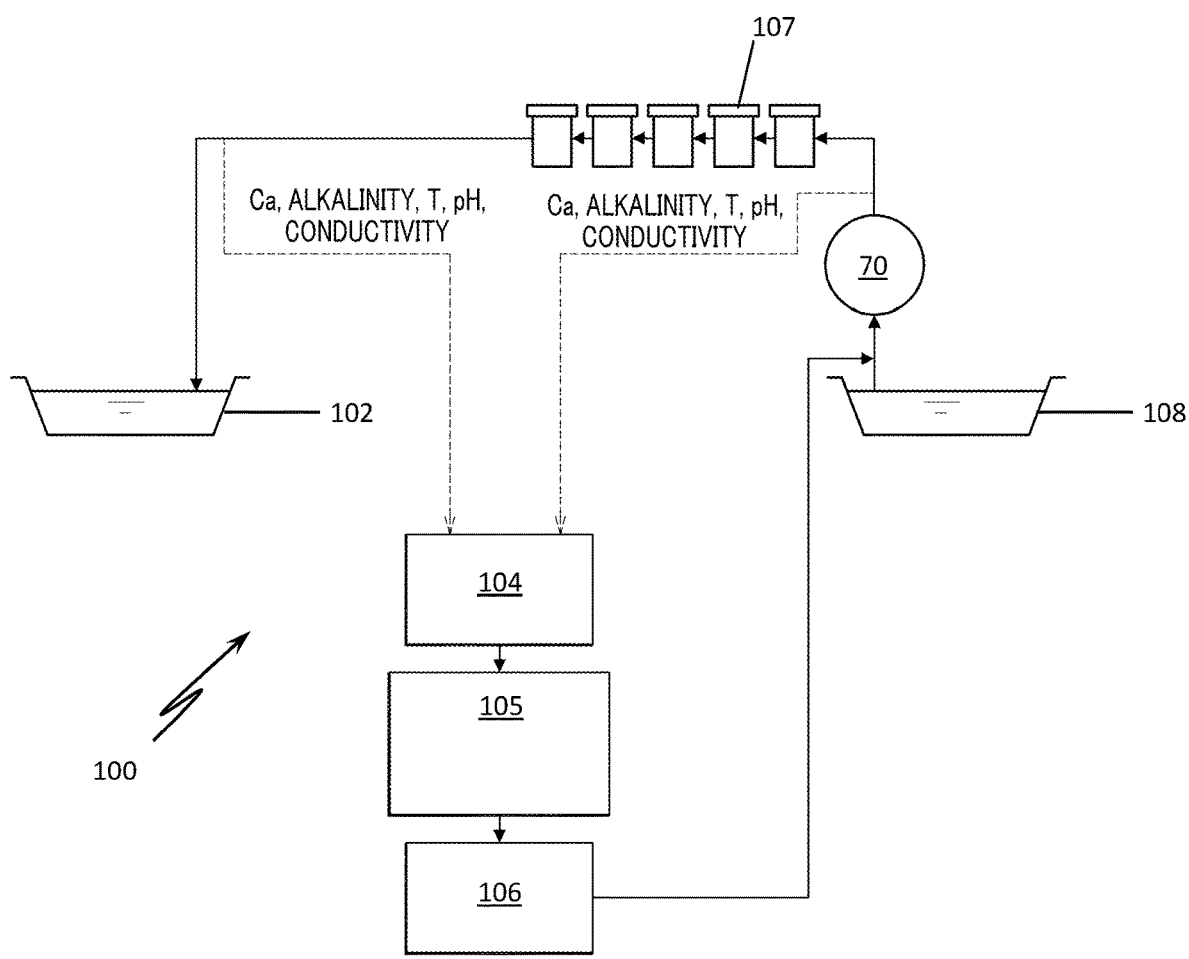
FIG. 10 is a schematic diagram of a mineral process system including an automated chemical feed control system according to an embodiment.

The mineral process system may be, for example, a gold mining system 300, as illustrated in FIGS. 8-10. According to embodiments, the process water calcium and M-alkalinity concentrations, pH, conductivity and temperature are measured in water samples from at least one of the barren tank 301 and barren pond 302 and the heap leach/patio 103 via pumps 70 using the data capture system 304, as shown in FIG. 8. The SSI for the water sample from the at least one of the barren tank 301 and barren pond 302 and/or the heap leach/patio 303 is then calculated using the controller 305, and the anti-sealant is fed via the anti-sealant feed system 306. The controller 305 may be, for example, a data analytics/communication system.

Measurements can be made at one point or several points in a single mining process stream to determine and then adjust the anti-sealant feed rate to be that circuit operation. As seen in FIG. 9, anti-sealant may be fed to the process water at several points in the leach circuit. Feedpoints may include dosing of anti-sealant to the barren solution being pumped from the barren tank 301 and/or barren pond 302 via pumps 370 to the leach pads, and to the pregnant solution from pregnant pond 308 being pumped via pumps 370 to the carbon-in-column operation 307. Based on the inputs of calcium, alkalinity, temperature, pH, and conductivity, the SSI can be calculated by the controller 305 in the panel. Appropriate for most mining streams, due to their high levels of alkalinity and pH, is the application of the PSI. Once the index has been calculated, the PLC will determine the appropriate anti-sealant feed rate. The controller 305 can be used and programmed to refine the anti-sealant feed rate at the mine site. For example, a calcium balance in the circuit can be used to assess anti-sealant performance. A calcium balance is determined by measuring the levels of calcium at the initial point of anti-sealant application and again at the end of that particular process stream. Ideally, there should be no loss in calcium across this stream if the feed rate of anti-sealant is adequate. For example, as shown in FIG. 10, the calcium levels could be measured at the outlet of the pregnant pond where anti-sealant is being dosed, and then again at the outlet of the carbon columns. If the calcium levels are the same, it would indicate that no calcium was being lost in this circuit, and that the anti-sealant dosage was adequate for the SSI being calculated. If there was a loss of calcium in this circuit (i.e., a decrease in the calcium level exiting the carbon columns versus at the start in the outlet of the pregnant pond) of more than 5%, for example, it could be concluded that the feed rate of anti-sealant was too low for the SSI being calculated, and the logic in the PLC for the SSI-to-anti-sealant dosage could be adjusted upwards to account for the actual field conditions. Conversely, if the calcium balance was fine (no losses greater than 5%, and the SSI remained fairly constant), the logic response for the SSI-to-anti-sealant dosage could be adjusted downwards to further optimize the anti-sealant feed rate to the stream.

It will be appreciated that the above-disclosed features and functions, or alternatives thereof, may be desirably combined into different methods and systems. Also, various alternatives, modifications, variations or improvements may be subsequently made by those skilled in the art, and are also intended to be encompassed by the disclosed embodiments. As such, various changes may be made without departing from the spirit and scope of this disclosure.

The invention claimed is:

1. A method for applying a chemical treatment solution to a process stream in an industrial processing system, the method comprising, while the industrial processing system is online:
measuring a pH of the process stream;
calculating a scale saturation parameter based on the measured pH of the process stream;
determining in real time a dosage of the chemical treatment solution based on a relationship between the dosage and the calculated scale saturation parameter; and
controlling application of the chemical treatment solution to the process stream based on the determined dosage.

2. The method for applying a chemical treatment solution to a process stream according to claim 1, further comprising calculating the relationship based on the measured pH of the process stream.

3. The method for applying a chemical treatment solution to a process stream according to claim 1, further comprising measuring at least one of temperature, calcium concentration, salinity, conductivity, mineral hardness, and alkalinity of the process stream; and
calculating the relationship based on the at least one of temperature, calcium concentration, salinity, conductivity, mineral hardness, and alkalinity of the process stream.

4. The method for applying a chemical treatment solution to a process stream according to claim 1, wherein the pH of the process stream is measured continuously.

5. The method for applying a chemical treatment solution to a process stream according to claim 1, wherein the pH of the process stream is measured in intervals.

6. The method for applying a chemical treatment solution to a process stream according to claim 1, wherein the chemical treatment solution includes at least one anti-sealant selected from the group consisting of hydroxyethylidene diphosphonic acid, phosphonobutane tricarboxylate, polyamino polyether methylenephosphonate, amino-tris-methylene phosphonate, diethylenetriaminepenta(methylene-phosphonate), polymaleic anhydride, acrylic acid/acrylamido methyl prone-sulfonate, phosphino-carboxylic acid polymer, and polyacrylic acid.

7. The method for applying a chemical treatment solution to a process stream according to claim 1, wherein the process stream is a water stream in a water system, and application of the chemical treatment solution to the water stream includes feeding the chemical treatment solution upstream of a heat exchanger in the water system.

8. The method for applying a chemical treatment solution to a process stream according to claim 1, wherein the process stream is a mineral process stream in a mineral process system, and application of the chemical treatment solution to the mineral process stream includes feeding the chemical treatment solution upstream of a heap leach in the mineral process system.

9. The method for applying a chemical treatment solution to a process stream according to claim 1, wherein controlling the application of the chemical treatment solution to the process stream includes controlling a rate of application of the chemical treatment solution.

10. The method for applying a chemical treatment solution to a process stream according to claim 8, where a rate of the chemical treatment solution applied is increased or decreased during a time period corresponding to a time period of increased seasonal or operational load on the industrial processing system.

11. The method for applying a chemical treatment solution to a process stream according to claim 1, wherein controlling the application of the chemical treatment solution to the process stream includes controlling an amount of the chemical treatment solution applied.

12. The method for applying a chemical treatment solution to a process stream according to claim 1, where an amount of the chemical treatment solution applied is increased or decreased during a time period corresponding to a time period of increased or decreased seasonal or operational load on the industrial processing system.

13. The method for applying a chemical treatment solution to a process stream according to claim 1, wherein the relationship is a scale saturation curve.

14. The method for applying a chemical treatment solution to a process stream according to claim 1, further comprising recording the measured pH of the process stream.

15. The method for applying a chemical treatment solution to a process stream according to claim 1, wherein the industrial processing system is a process cooling water system in a primary metal system.

16. The method for applying a chemical treatment solution to a process stream according to claim 1, wherein the industrial processing system is a process cooling water system in an iron or steelmaking system.

17. The method for applying a chemical treatment solution to a process stream according to claim 1, wherein the industrial processing system is a once-through water system or a recirculating water system.

18. The method for applying a chemical treatment solution to a process stream according to claim 1, wherein the industrial processing system is a gold-mining system.

19. A non-transitory computer readable storage medium storing a program for causing a computer to execute the method as claimed in claim 1.

20. An industrial processing system in which a chemical treatment solution is applied to a process stream, the industrial processing system comprising:
a pH sensor configured to measure a pH of the process stream while the industrial processing system is online;
a controller configured to execute the steps of:
calculating a scale saturation parameter based on a real-time measurement of the pH of the water stream with the pH sensor;
determining in real time a dosage of the chemical treatment solution based on a relationship between the dosage and the calculated scale saturation parameter; and controlling application of the chemical treatment solution to the process stream based on the determined dosage.

\* \* \* \* \*